United States Patent
Bouchard (10) Patent No.: US 11,288,049 B2
(45) Date of Patent: Mar. 29, 2022

(54) SOURCE TO SOURCE COMPILER, COMPILATION METHOD, AND COMPUTER-READABLE MEDIUM FOR PREDICTABLE MEMORY MANAGEMENT

(71) Applicant: Fornux Inc., Gatineau (CA)

(72) Inventor: Philippe Bouchard, Gatineau (CA)

(73) Assignee: Fornux Inc.

( * ) Notice: Subject to any disclaimer, the term of this patent is extended or adjusted under 35 U.S.C. 154(b) by 48 days.

(21) Appl. No.: 16/725,342

(22) Filed: Dec. 23, 2019

(65) Prior Publication Data
US 2020/0210159 A1 Jul. 2, 2020

(30) Foreign Application Priority Data
Dec. 24, 2018 (CA) ..................................... 3028506

(51) Int. Cl.
| | |
|---|---|
| *G06F 9/45* | (2006.01) |
| *G06F 8/51* | (2018.01) |
| *G06F 8/30* | (2018.01) |
| *G06F 12/02* | (2006.01) |
| *G06F 21/52* | (2013.01) |
| *G06F 16/188* | (2019.01) |

(Continued)

(52) U.S. Cl.
CPC ................ *G06F 8/51* (2013.01); *G06F 8/315* (2013.01); *G06F 12/023* (2013.01); *G06F 11/366* (2013.01); *G06F 12/0891* (2013.01); *G06F 16/188* (2019.01); *G06F 16/80* (2019.01); *G06F 21/52* (2013.01); *G06F 40/143* (2020.01); *G06F 2212/251* (2013.01)

(58) Field of Classification Search
CPC .......... G06F 8/51; G06F 8/315; G06F 16/188; G06F 16/80; G06F 11/366; G06F 40/143; G06F 12/0891; G06F 12/023; G06F 21/52; G06F 2212/251
See application file for complete search history.

(56) References Cited

U.S. PATENT DOCUMENTS

| | | | | |
|---|---|---|---|---|
| 5,644,709 A | * | 7/1997 | Austin .................. | G06F 11/366 711/154 |
| 2011/0179347 A1 | * | 7/2011 | Proctor ................. | G06F 40/143 715/234 |

(Continued)

OTHER PUBLICATIONS

Clang library frontend for LLVM which includes parser for C and C++ source codes (https://clang.llvm.org/).

(Continued)

*Primary Examiner* — Tuan A Vu
(74) *Attorney, Agent, or Firm* — Price Heneveld LLP (57) ABSTRACT

Described are various embodiments of a source-to-source compiler, compilation method, and computer-readable medium for predictable memory management. One embodiment is described as a memory management system operable on input source code for an existing computer program, the system comprising: a computer-readable medium having computer-readable code portions stored thereon to implement, when executed, a deterministic memory manager (DMM), wherein said code portions comprise smart pointer code portions and associated node pointer code portions for implementing a smart pointer that automatically corrects for memory misallocations in target memory allocation source code portions.

14 Claims, 6 Drawing Sheets

(51) Int. Cl.
　　 *G06F 12/0891* (2016.01)
　　 *G06F 16/80* (2019.01)
　　 *G06F 40/143* (2020.01)
　　 *G06F 11/36* (2006.01)

(56) References Cited

U.S. PATENT DOCUMENTS

| | | | | |
|---|---|---|---|---|
| 2013/0007065 A1* | 1/2013 | Grechanik | ............ | G06F 16/80 707/802 |
| 2014/0283040 A1* | 9/2014 | Wilkerson | ............ | G06F 21/52 726/22 |
| 2015/0067225 A1* | 3/2015 | Ravi | ............ | G06F 12/023 710/308 |
| 2017/0031815 A1* | 2/2017 | Varma | ............ | G06F 12/0891 |
| 2018/0095984 A1* | 4/2018 | Ngo | ............ | G06F 16/188 |

OTHER PUBLICATIONS

Philippe Bouchard, source code of node_base.hpp file from Nov. 14, 2017 commit: https://github.com/philippeb8/root_ptr/blob/2f50d3a4892d6da5fdc2d74f0a182d7e6aead6e7/include/boost/smart_ptr/detail/node_base.hpp (Full repository available at: https://github.com/philippeb8/root_ptr).

Philippe Bouchard, GitHub commit page showing changes dated Dec. 24, 2017 to source code of node_base. hpp, node_ptr_base. hpp, and root_ptr.hpp files implemented with the lib archive library. Available at: https://github.com/philippeb8/root_ptr/commit/ce9b4e4bbba26371cf040c4f38ff02b0347d732b#diff-c6b1a07c8c5a8144faf552d09576eed2.

Philippe Bouchard, GitHub commit page showing changes dated Nov. 14, 2017 to source code of node_base. hpp, node ptr base.hpp, and root_ptr.hpp files implementing distinction between iterators and pointers. Available at: https://github.com/philippeb8/root_ptr/commit/2f50d3a4892d6da5fdc2d74f0a182d7e6aead6e7#diff-c6b1a07c8c5a8144faf552d09576eed2.

Philippe Bouchard, Boost proposal website to include root_ptr to the Boost C++ source libraries (2016). Available from https://github.com/philippeb8/philippeb8.github.io/tree/master/root_ptr (last updated Dec. 13, 2016).

Philippe Bouchard, Exemplary source code files for using the root_ptr (from https://github.com/philippeb8/philippeb8.github.io/tree/master/example) (https://github.com/philippeb8/philippeb8.github.io/blob/master/example/Jamfile.v2) Mar. 31, 2016.

Philippe Bouchard, Google Groups discussion involving the inventor, Aug. 9, 2017.

Philippe Bouchard, Fornux C Leak Detector, YouTube video available from url: https://www.youtube.com/watch?v=AUY0UEepxql uploaded Oct. 10, 2017.

Philippe Bouchard, source code for node_ptr_base.hpp from Nov. 14, 2017 commit: https://github.com/philippeb8/root_ptr/blob/2f50d3a4892d6da5fdc2d74f0a182d7e6aead6e7/include/boost/smart_ptr/detail/node_ptr_base.hpp (Full repository available at: https://github.com/philippeb8/root_ptr).

Philippe Bouchard, source code for root_ptr.hpp from Nov. 14, 2017 commit: https://github.com/philippeb8/root_ptr/blob/2f50d3a4892d6da5fdc2d74f0a182d7e6aead6e7/include/boost/smart_ptr/root_ptr.hpp (Full repository available at: https://github.com/philippeb8/root_ptr).

Philippe Bouchard, Slides of YouTube video available from url: https://www.youtube.com/watch?v=VZL5X2FIZKU&feature=youtu.be uploaded May 13, 2018.

* cited by examiner

SOURCE TO SOURCE COMPILER, COMPILATION METHOD, AND COMPUTER-READABLE MEDIUM FOR PREDICTABLE MEMORY MANAGEMENT

CROSS-REFERENCE TO RELATED APPLICATIONS

This application claims priority to Canadian Patent Application No. 3,028,506 filed Dec. 24, 2018, which is incorporated herein by reference in its entirety.

FIELD OF THE DISCLOSURE

The present disclosure relates to memory management in computer programs, and, in particular, to a source-to-source compiler, compilation method, and computer-readable medium for predictable memory management.

BACKGROUND

A memory leak is said to occur when a computer program incorrectly manages memory allocations in such a way that memory which is no longer needed is not released or when an object is stored in memory but cannot be accessed by the running code. A memory leak reduces the performance of the computer by reducing the amount of available memory. Eventually, in the worst case, too much of the available memory may become allocated and all or part of the system or device stops working correctly, the application fails, or the system slows down. Another possible consequence of memory misallocation are segmentation faults which cause an application being executed to crash when accessing a memory location that was already previously deallocated or never allocated in the first place.

Different products or methods are currently available to identify memory leaks. Proprietary products such as Rational Purify, Parasoft Insure++ and Valgrind are runtime memory debuggers that can detect a range of memory misallocations during runtime. However, these use proprietary techniques to detect memory leaks such as flagging each memory byte, which has the drawback of being slow and not portable. These techniques are also applied at the development stage only, where the developer will need to apply the suggested corrections explicitly, which provides yet another potential drawback. The non-portability aspect is also a drawback when testing programs such as real-time communication applications.

Other solutions exist where portions of additional source code are injected into the application source and/or by adding additional references to external libraries. A first example is to add a garbage collector functionality into an input C/C++ program to correct or improve its memory managing abilities. Different garbage collectors are available such as the open-source Boehm-Demers-Weiser garbage collector. Unfortunately, this technique simply postpones the deallocation of the unreferenced objects to later to collect them using various tracing algorithms which may temporarily freeze the entire application on a single CPU system. This may be unacceptable for real-time applications or device driver implementation, and for solar or battery-powered devices, the power consumed by garbage collection might also be significant, for example. Another such technique is known as reference counting where objects pointed to are aware of the number of times they are referenced. This means a counter within the object is incremented or decremented according to the number of smart pointers that are referencing or dereferencing it. One particular drawback is the inability to detect a group of blocks of memory referencing each other (called "cyclic") unnoticed and therefore never freed by the application.

Finally, a range of "smart pointers" have been introduced in recent years which can be used when coding a C++ application. Smart pointers are objects which store pointers to dynamically allocated (heap) objects. When used in a C++ program, they behave much like built-in C++ pointers except that, in principle, they automatically delete the object pointed to at the appropriate time. Different smart pointers include the shared_ptr ("shared pointer"). These nonetheless share various drawbacks.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for predictable memory management systems and methods that overcome some of the drawbacks of known techniques, or at least, provides a useful alternative thereto.

In accordance with one aspect, there is provided a memory management system operable on input source code for an existing computer program, the system comprising: a computer-readable medium having computer-readable code portions stored thereon to implement, when executed, a deterministic memory manager (DMM), wherein said code portions comprise smart pointer code portions and associated node pointer code portions for implementing a smart pointer that automatically corrects for memory misallocations in target memory allocation source code portions; a source-to-source compiler operable to: automatically identify memory allocation source code portions within the input source code; and automatically inject corresponding DMM code portions of said DMM into the input source code to specifically target said automatically identified memory allocation source code portions therein to thereby generate an improved source code that once compiled, produces a correspondingly improved computer program that automatically replaces the memory management in the input source code through execution of said injected corresponding DMM code portions.

In one embodiment, the input source code and the improved source code are C or C++ source codes.

In one embodiment, the smart pointer is a Root Pointer.

In one embodiment, said identifying and injecting comprise statically analyzing the Abstract Syntax Tree (AST) of the input source code.

In one embodiment, said analyzing is implemented using a Clang C-language family front end.

In one embodiment, said smart pointer further comprises a local memory allocation node pointer.

In one embodiment, said source-to-source compiler comprises a computer-readable medium having instructions stored thereon to define a binary executable file that, when executed, performs the functions thereof.

In one embodiment, the system further comprises an output compiler for compiling said improved source code to produce said improved computer program.

In accordance with another aspect, there is provided a method for converting an input source code into an improved source code to address memory misallocations therein, the method comprising, using a hardware processor: statically analyzing said input source code to identify memory-allocation-related code portions; and injecting corresponding memory management code portions to specifically target said identified memory-allocation-related code portions into the input source code such that, upon being compiled and executed, said injected memory management code portions automatically replaces the memory management in the input source code.

In one embodiment, said statically analyzing comprises: generating an Abstract Syntax Tree (AST) of the input source code; and printing said AST to inject said memory-allocation-related code portions.

In one embodiment, said memory management code portions comprise smart pointer code portions and associated node pointer code portions of a deterministic memory manager (DMM).

In one embodiment, said DMM is a Root Pointer.

In one embodiment, the input source code and the improved source code are C or C++ source codes.

According to another aspect, there is provided a smart pointer (e.g. Root Pointer) for improved deterministic memory management for local memory allocations in a C or C++ source code, said Root Pointer comprising: one node_proxy class instance instantiated at a compound statement and operable to identify a depth level on the stack frame from which each Root Pointer will be associated therewith; an extra parameter added to each function referencing the node_proxy from which said function is called therefrom to promote objects allocated within said function if said Root Pointer reassignment of a higher scope is performed; an extra member object in each class referencing the node_proxy from which said class was instantiated therefrom to propagate said reference to all Root Pointers used by other member variables; and a list of all associated Root Pointers at said depth level of said node_proxy class instance; wherein upon implicit destruction of said node_proxy causes the associated Root Pointers at the same depth level to be deallocated automatically Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples in which predictable memory management for automatically correcting memory misallocations in a C or C++ program may be achieved. The herein-described embodiments are directed to injecting a memory manager, which in some embodiments takes the form of a "smart pointer" such as the Root Pointer as illustratively described herein, and code portions related thereto, into existing C or C++ source code to provide improved memory management features.

Figure 1A:
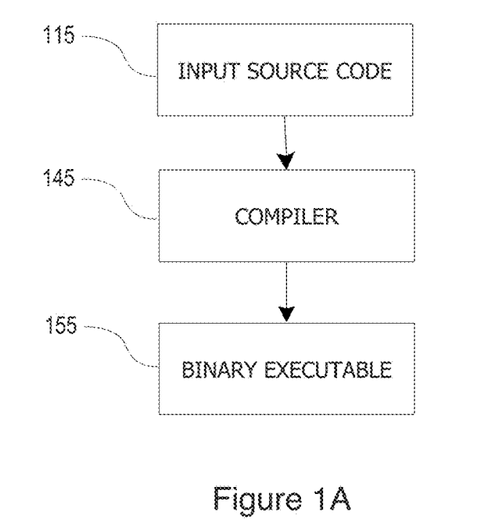
FIGS. 1A and 1B are process flow diagrams of a computer software compilation process, without and with using a source-to-source compiler to implement a deterministic memory manager, according to one embodiment.
Figure 1B:
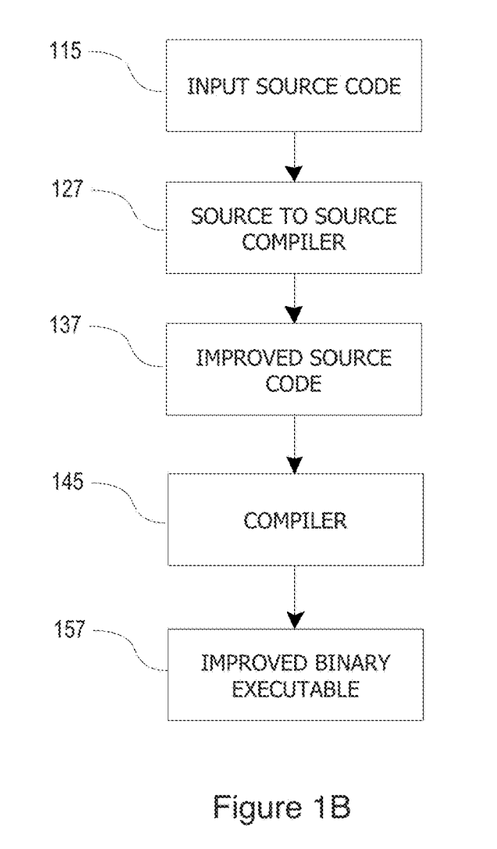

With reference to FIGS. 1A and 1B, and in accordance with one exemplary embodiment, a method and system for improving the memory management in an existing C/C++ source code will be described. FIG. 1A illustrates a simplified process of producing a binary executable from an initial source code 115. In FIG. 1A, input source code 115 is an existing C/C++ source code comprising, in part, problematic memory management code portions. Thus, input source code 115 is used by compiler 145 to produce compiled binary executable 155 which can then be executed on a digital processor. However, executable 155 compiled from defective input source code 115 may produce memory leaks which will increase the memory footprint of the application as a function of runtime which may cause slowdowns or even crashing. FIG. 1B illustrates how the solution proposed herein improves on this process, by using a source-to-source compiler 127 which takes input source code 115 and generates therefrom an improved source code 137, into which code portions where added and/or changed to implement a deterministic memory manager. The resulting improved source code 137 may then be compiled normally with compiler 145 to produce a corresponding improved binary executable which automatically corrects memory misallocations, and reduces, if not entirely removes memory leaks and/or segmentation faults.

The deterministic memory manager may be in the form of one or more C++ code portions that, once injected into an existing C/C++ application source code, converts it into a more advanced C++ code which, once compiled normally, is further operable to detect and fix memory leaks at runtime. An example of a deterministic memory manager for C/C++ language programs in the Root Pointer method (hereinafter referred to simply as Root Pointer). In general, the Root pointer is a "container-oriented" memory manager on top of reference counting that is also able to detect outright unreferenced cyclic blocks of memory. It is deterministic so the destruction of the objects is predictable. The general purpose of Root Pointer is to offer a predictable solution like the reference counting and to provide a means to manage groups of related memory allocations using a root_ptr pointer object. Each related memory allocation is associated to a node_proxy and attached to one root_ptr. Because root_ptrs are grouped and owned by a node_proxy, they are destroyed, as a group, when the corresponding node_proxy is destroyed, regardless of cycles.

Figure 2:
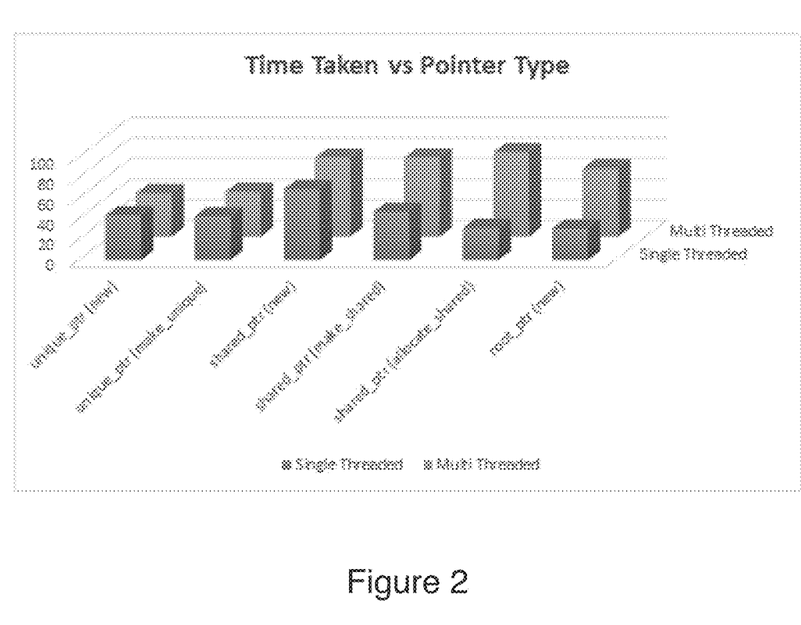
FIG. 2 is a graphical plot illustrating a comparative performance loss for various types of smart pointers.

Integrating the Root Pointer in an input C/C++ source code results in an improved compiled application that retains its normal execution speed and features. Such a memory manager may also work for embedded devices that are programmed with the C/C++ languages. It can be used to create C/C++ source code without worrying about explicitly deallocating memory or other memory-related problems. Moreover, Root Pointer may be used to fix memory leaks resulting from cyclic pointer references (also known as a circular reference). A cyclic pointer reference is a series of references where each pointer references the next pointer, and the last pointer in this sequence references back to the first, causing a referential loop. Moreover, using the Root Pointer instead of other smart pointers does not result in an increased performance loss, as is shown in the plot of FIG. 2, for example.

Figure 3A:
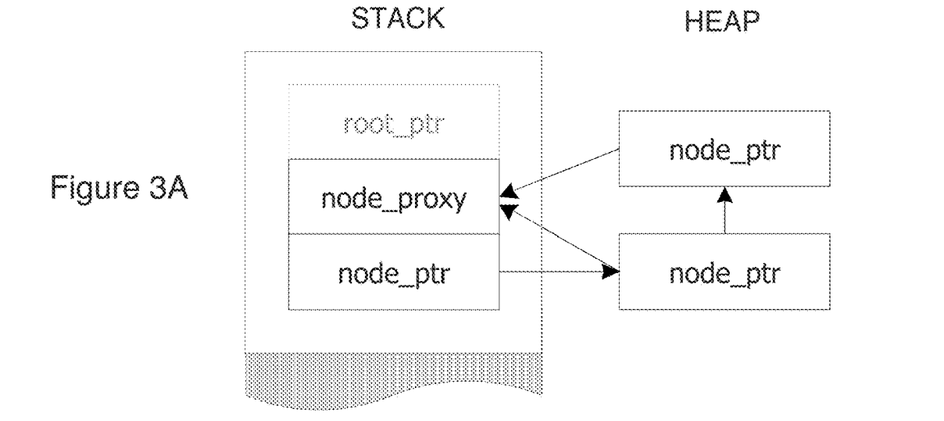
FIGS. 3A to 3C are schematic diagrams illustrating how the Root Pointer memory manager functions in the case of cyclic pointer assignments.
Figure 3B:
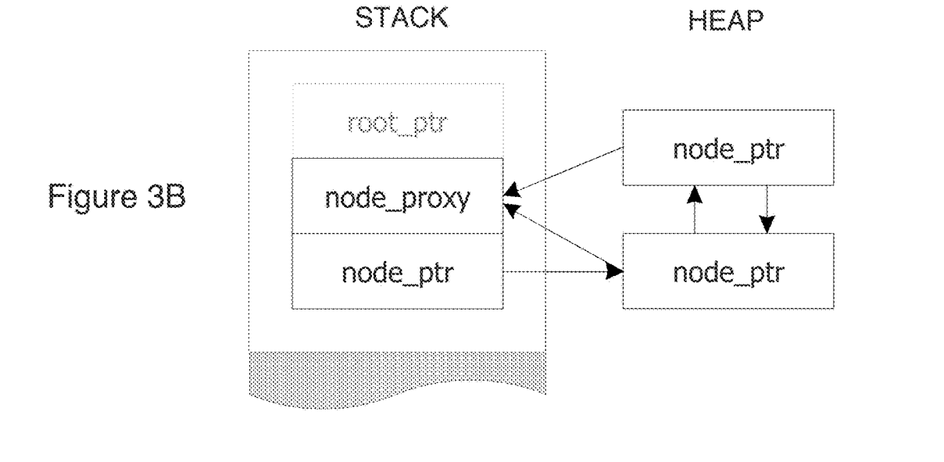
Figure 3C:
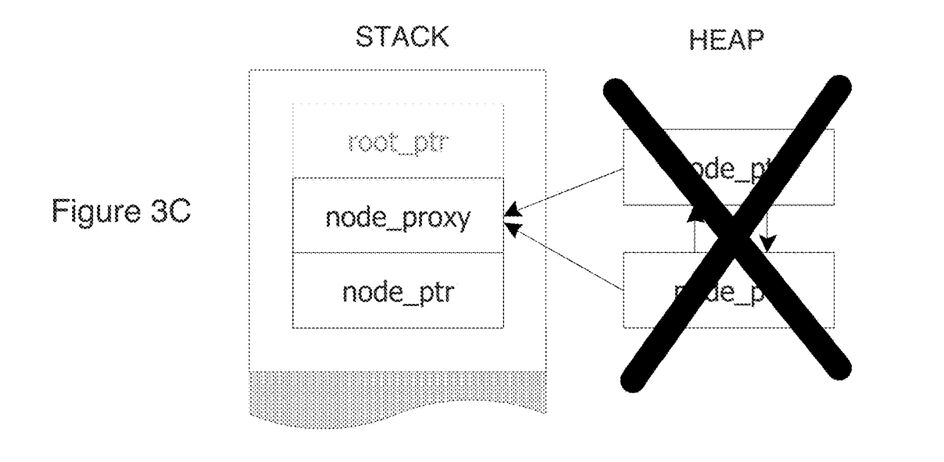

The Root Pointer may be understood to be similar to other "smart pointer" classes which wrap raw C/C++ pointers with added functionalities, usually to better control allocation/deallocation of the memory associated with the pointers. However, Root Pointer further introduces the concept of a set defined as one or more memory blocks referencing each other that are allocated on the heap that is pointed to by one or many root_ptr<T>s allocated elsewhere by the application. Each set is consequently composed of a list of all memory blocks constituting it and a node_proxy linking each allocation and other potential node_proxy as illustrated in FIG. 3A. Therefore, whenever a node_proxy contained within a root_ptr<T> is about to be destroyed, the deallocation of each memory block composing the set is enforced. Thus, whether the set was composed of memory blocks referencing each other in a cyclic way or not, all of them will be subject to destruction and deallocation indifferent from the cyclicism problem presented by the reference counters. As we can see in FIGS. 3B and 3C, a node_proxy is destroyed and consequently every element composing the set will be destructed and deallocated as well (as seen specifically in FIG. 3C).

Figure 4A:
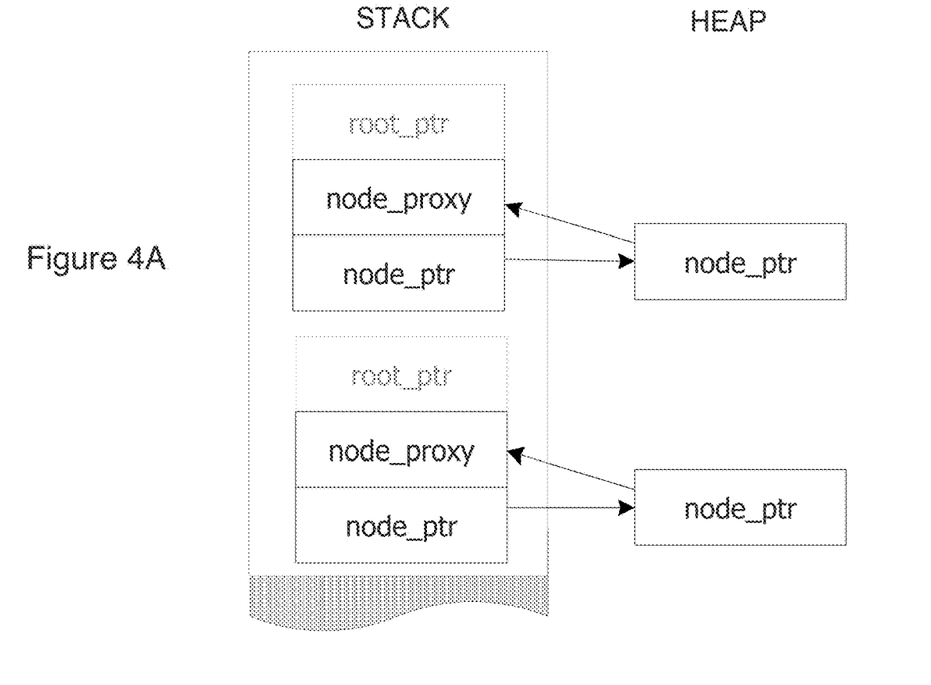
FIGS. 4A and 4B are schematic diagrams illustrating how the Root Pointer memory manager functions in the case of pointers in a union declaration.
Figure 4B:
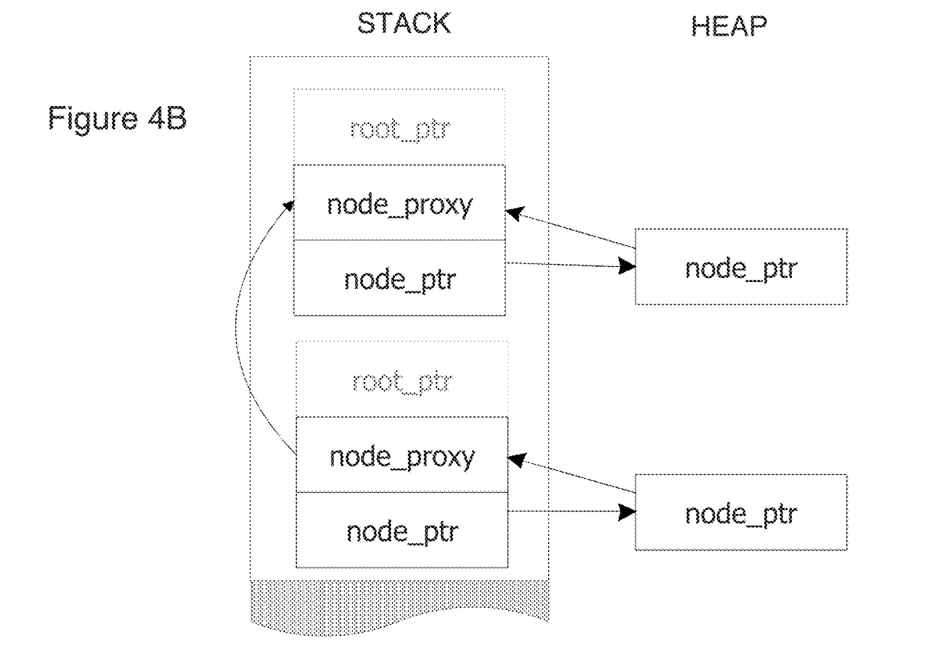

Moreover, a set may further be unified with another set whenever one of its members is found to reference a member from a different set. FIG. 4A shows two sets, each having their own reference. Once two sets are unified, as shown in FIG. 4B, they will stay unified even if the new reference responsible for unifying the sets is once again disjointed.

Root Pointer was designed to be easy to use and to be versatile in terms of object variants it can refer to. In one embodiment, its only requirement is limited to the usage of a special type needed to instantiate objects referred to. For example:

```
{
    node_proxy ___x;
    root_ptr<int> p(___x, "p", new node<int>(11));
}
``` will instantiate a special object having an integer as the pointee object. The pointer to the object is then passed to the root_ptr<int> which will manage its existence and later destroy and deallocate it when it is found to be no longer referenced. The node_proxy guarantees that all associated allocations, cyclic or not, will be freed upon destruction. A root_ptr<int> is an internal pointer in a set of objects which uses the information of the associated node_proxy to define its length of existence.

As its name suggests, this can be used, for example, as node pointers inside a container for a given root, for example:

```
struct list_node
{
    node_proxy const & x;
    root_ptr<list_node> prior = root_ptr<list_node>(___x, "prior");
    root_ptr<list_node> next = root_ptr<list_node>(___x, "next");
```

-continued

```
    list_node(node_proxy const & ___y) : ___x(___y)
    {
    }
};
struct list
{
    node_proxy const & ___x;
    root_ptr<list_node> root = root_ptr<list_node>(___x, "root");
    list(node_proxy const & ___y) : ___x(___y)
    {
    }
    void clear( )
    {
        root.reset( );
    }
    void insert( )
    {
        if (root.get( ) == 0)
        {
            root = new node<list_node>( );
            root->next = root;
            root->prior = root;
        }
        else
        {
            root_ptr<list_node> p = new node<list_node>( );
            p->next = root;
            p->prev = root->prev;
            root->prev->next = p;
            root->prev = p;
        }
    }
};
```

In the example above, the list::root is actually a root_ptr<list_node> and therefore a new node<list_node>( ) must be used to assign a value to it. Likewise list_node::next is in turn a root_ptr<list_node> and thus a new node<list_node>( ) must but used. The result is a cyclic container that will implicitly get destructed with no need to iterate through all list_nodes.

However, implementing Root Pointer in an existing C/C++ source code correctly requires a deep understanding of its functionality, thus increasing the chance that errors are introduced in the input source code. Therefore, as mentioned above, there is a need for a source-to-source compiler for automatically injecting the relevant code portions of the Root Pointer, or like smart pointer, into an existing source code.

Generally, a source-to-source compiler (STSC), trans-compiler or transpiler is a type of compiler that takes the source code of a program written in one programming language as its input and produces the equivalent and sometimes improved source code in the same or another programming language. In the case of memory management, a programmer may concentrate on using normal programming practices to write a program or application that comprises the required features (e.g. using C/C++ language), and then use the STSC to process this input source code and generate automatically therefrom an improved source code (e.g. an improved C/C++ source code) that retains the original functionalities but also has the added feature of having the deterministic memory manager included therein.

Figure 5:
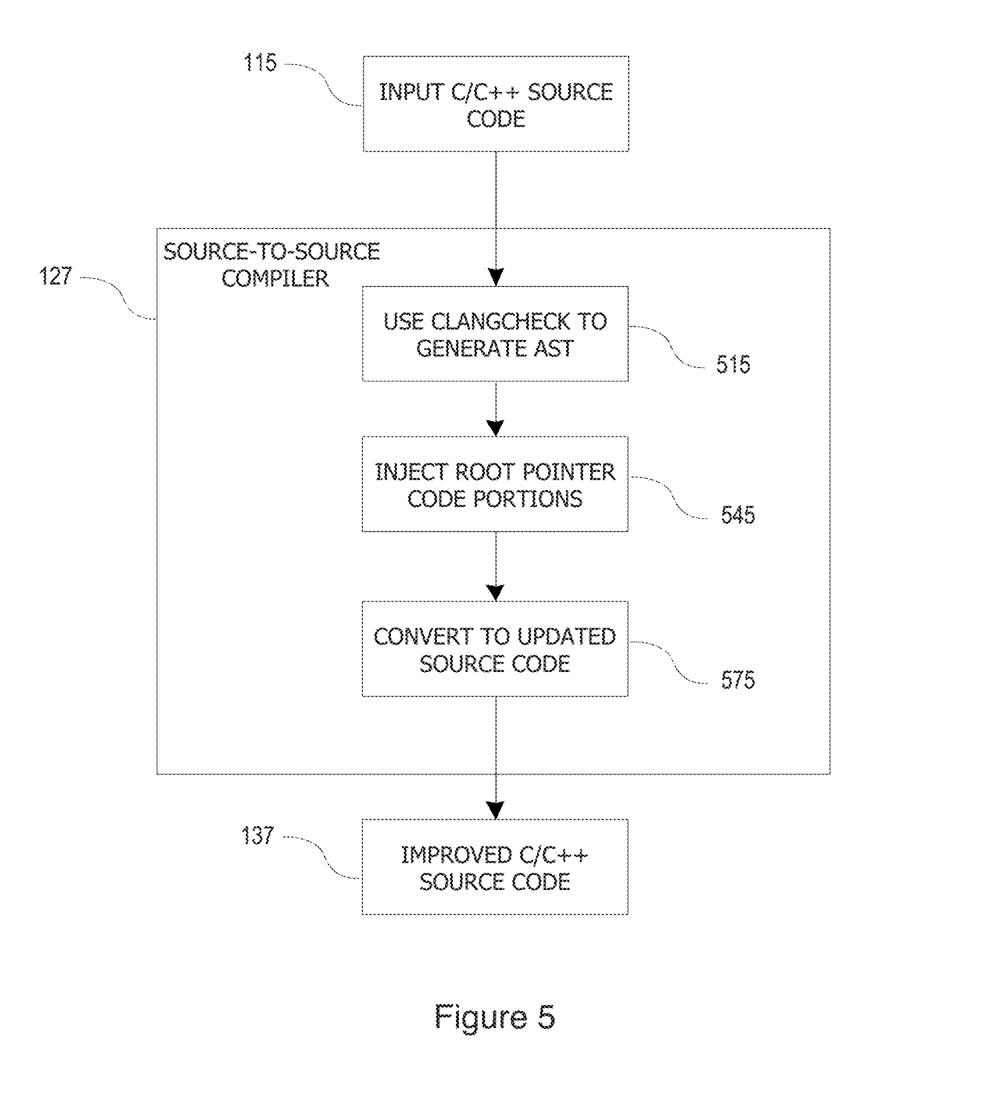
FIG. 5 is a process flow diagram of an implementation of a source-to-source compiler for injecting Root Pointer associated code portions into an input source code, according to one embodiment.

In some embodiments, the STSC may be implemented with the aid of existing compiler tools for parsing input C/C++ source code. For example, in some embodiments (as shown for example in FIG. 5), the ClangCheck utility for the Clang C-language family front end for the LLVM compiler may be used to do a static analysis of the input source code. In general, a compiler front end is responsible for parsing the source code, checking it for errors and turning the input code into an Abstract Syntax Tree (AST). The latter is a structured representation, which can be used for different purposes such as creating a symbol table, performing type checking and finally generating code. Once the AST is built, the AST's structure may be outputted or printed so as to be further manipulated or edited to change the underlying source code.

ClangCheck combines the LibTooling framework for running a Clang tool with the basic Clang diagnostics by parsing and syntax checking specific files in a fast, command line interface. In some embodiments in which the STSC uses ClangCheck for syntax checking, the memory management code portions may be inserted in each function of an input C/C++ source code efficiently.

In some embodiments, the AST is not directly modified in any way but only the reserved Printer functions (for example the -ast-print option flag) are used, wherein these functions are comprised in only three main files in the internal Clang source code: DeclPrinter.cpp, StmtPrinter.cpp and TypePrinter.cpp. These printer functions are used to insert, remove and replace code in the AST.

The first file prints all variable and function declarations and definitions respectively, as seen in the AST, and correspondingly outputs the resulting modified code in three substreams: the header, the body and the footer:
  The header stream includes "forward declarations" of all the new classes that will be used in the translation unit, or the file being processed;
  The body stream is the main one that includes the actual definitions of the classes, including their members, and definitions of the functions used; and
  The footer stream includes the definitions of all the new classes that are added in the code in order to properly iterate all members of the classes involved in the event all pointers need to be reassigned to a new node_proxy, for example.
It is also in this file that a new reference to a node_proxy is added to each class, in order to associate each of its members to that specific node_proxy only.

The second file prints all statements comprising the functionality and algorithms of the functions. For example, this is where each compound statement, defined by curly braces, will add an instantiation of a node_proxy object. The latter will then be associated to all Root Pointers used within that scope.

The third file prints everything before and after type instantiations and function prototypes a C++ application may have. For example, this is where the extra reference to the node_proxy parameter is passed to each function being modified so that this specific function may know from which scope it was called and possibly reassign all Root Pointers within that function to the higher scope node_proxy passed as an argument.

The modified output files may then be converted back to an improved C++ source code. The user may then take this improved source code and compile it using their compiler of choice. The resulting output source code is generally guaranteed to work with most C++ 11 compatible compilers. This flexibility is required in some cases where the STSC is to be integrated into an already existing programming pipeline. In some embodiments, a wrapper script may be used to implement the source-to-source compiler in a scripting language such as bash (or csh etc.) by calling the above described functions of a modified ClangCheck executable operable to inject the Root Pointer code portions.

In some embodiments, a wrapper script may be used to call a modified ClangCheck executable (therein referred to as "fcxxss") to identify the memory allocation regions of an input source code and inject therein the Root Pointer related code portions. Below is shown such an exemplary wrapper script, according to one embodiment, which is operable take an input source code and apply modified ClangCheck print functions to generate the improved source code:

```bash
#!/bin/bash

# Fornux C++ Superset Source-to-Source Compiler

# Copyright (c) Fornux Inc. 2018

ROOTDIR=$(dirname "$0")/..
usage( )
{
    echo "Usage: $0 [options] file"
    echo
    echo "Fornux C++ Superset Source-to-Source Compiler."
}
RM=rm
CCFLAGS="-Wno-shadow -Wno-unused-parameter -Wno-unused-value -Wno-missing-
prototypes -Wno-format-security -Wno-extern-initializer -Wno-gcc-compat -Wno-null-
dereference -DBOOST_ERROR_CODE_HEADER_ONLY"
LDFLAGS=""
GETOPT=$(getopt       -a      -o    vcSEwCsI:L:D:U:o:f:W::m:g::O::x:d:l:B:b:V:       -l
username:,compiler:,linker:,pipe,ansi,std:,traditional,traditional-cpp,pedantic,pedantic-
errors,nostartfiles,nodefaultlibs,nostdlib,pie,rdynamic,static,static-libgcc,static-
libstdc++,shared,shared-
libgcc,symbolic,threads,pthreads,pthread,version,param:,idirafter:,include:,isystem:,c-
isystem:,cxx-
isystem:,imacros:,iprefix:,iwithprefix:,iwithprefixbefore:,isystem:,imultilib:,isysroot:,iquo
te:,specs:,sysroot:,param:,soname:,Xpreprocessor:,Xassembler:,Xlinker:,M,MM,MF:,MG
,MP,MT:,MQ:,MD,MMD -n $0 -- "$@")
if [[ $? != 0 ]]; then usage ; exit 1 ; fi
eval set -- "SGETOPT"
while true ; do
    case "$1" in
        -v) OPT+="$1 " ; shift 1 ;;
        -c) COMPILE+="$1 " ; shift 1 ;;
        -S) OPT+="$1 " ; shift 1 ;;
        -E) OPT+="$1 " ; shift 1 ;;
        -w) OPT+="$1 " ; shift 1 ;;
        -C) OPT+="$1 " ; shift 1 ;;
        -s) OPT+="$1 " ; shift 1 ;;
        -I) INCLUDE+="$1 $2 " ; shift 2 ;;
        -L) OPT+="$1$2 " ; shift 2 ;;
        -D) DEFINE+="$1 $2 " ; shift 2 ;;
        -U) OPT+="$1$2 " ; shift 2 ;;
        -o) OUTPUT+="$1 $2 " ; shift 2 ;;
        -f) OPT+="$1$2 " ; shift 2 ;;
        -W) OPT+="$1$2 " ; shift 2 ;;
        -m) OPT+="$1$2 " ; shift 2 ;;
        -g) OPT+="$1$2 " ; shift 2 ;;
        -O) OPT+="$1$2 " ; shift 2 ;;
        -x) OPT+="$1$2 " ; shift 2 ;;
        -d) OPT+="$1$2 " ; shift 2 ;;
        -l) LIBRARY+="$1 $2 " ; shift 2 ;;
        -B) OPT+="$1$2 " ; shift 2 ;;
        -b) OPT+="$1$2 " ; shift 2 ;;
        -V) OPT+="$1$2 " ; shift 2 ;;
        --username) USERNAME=$2 ; shift 2 ;;
        --compiler) CC=$2 ; shift 2 ;;
        --linker) LD=$2 ; shift 2 ;;
        --pipe) OPT+="$1 " ; shift 1 ;;
        --ansi) OPT+="$1 " ; shift 1 ;;
        --traditional) OPT+="$1 " ; shift 1 ;;
        --traditional-cpp) OPT+="$1 " ; shift 1 ;;
        --pedantic) OPT+="$1 " ; shift 1 ;;
        --pedantic-errors) OPT+="$1 " ; shift 1 ;;
        --nostartfiles) OPT+="$1 " ; shift 1 ;;
        --nodefaultlibs) OPT+="$1 " ; shift 1 ;;
        --nostdlib) OPT+="$1 " ; shift 1 ;;
        --pie) OPT+="$1 " ; shift 1 ;;
        --rdynamic) OPT+="$1 " ; shift 1 ;;
        --static) OPT+="$1 " ; shift 1 ;;
        --static-libgcc) OPT+="$1 " ; shift 1 ;;
        --static-libstdc++) OPT+="$1 " ; shift 1 ;;
        --shared) OPT+="$1 " ; shift 1 ;;
        --shared-libgcc) OPT+="$1 " ; shift 1 ;;
        --symbolic) OPT+="$1 " ; shift 1 ;;
        --threads) OPT+="$1 " ; shift 1 ;;
        --pthreads) OPT+="$1 " ; shift 1 ;;
```

```
        --pthread) OPT+="-pthread " ; shift 1 ;;
        --version) OPT+="$1 " ; shift 1 ;;
        --std) shift 2 ;;
        --param) OPT+="$1 $2 " ; shift 2 ;;
        --idirafter) OPT+="$1 $2 " ; shift 2 ;;
        --include) OPT+="$1 $2 " ; shift 2 ;;
        --isystem) ISYSTEM+="-isystem $2 " ; shift 2 ;;
        --c-isystem) ISYSTEM+="-c-isystem $2 " ; shift 2 ;;
        --cxx-isystem) ISYSTEM+="-cxx-isystem $2 " ; shift 2 ;;
        --imacros) OPT+="$1 $2 " ; shift 2 ;;
        --iprefix) OPT+="$1 $2 " ; shift 2 ;;
        --iwithprefix) OPT+="$1 $2 " ; shift 2 ;;
        --iwithprefixbefore) OPT+="$1 $2 " ; shift 2 ;;
        --isystem) OPT+="$1 $2 " ; shift 2 ;;
        --imultilib) OPT+="$1 $2 " ; shift 2 ;;
        --isysroot) OPT+="$1 $2 " ; shift 2 ;;
        --iquote) OPT+="$1 $2 " ; shift 2 ;;
        --specs) OPT+="$1 $2 " ; shift 2 ;;
        --sysroot) OPT+="$1 $2 " ; shift 2 ;;
        --param) OPT+="$1 $2 " ; shift 2 ;;
        --soname) OPT+="-install_name $2 " ; shift 2 ;;
        --Xpreprocessor) OPT+="$1 $2 " ; shift 2 ;;
        --Xassembler) OPT+="$1 $2 " ; shift 2 ;;
        --Xlinker) OPT+="$1 $2 " ; shift 2 ;;
        --M) PPOUTPUT+="-M " ; shift 1 ;;
        --MM) PPOUTPUT+="-MM " ; shift 1 ;;
        --MF) PPOUTPUT+="-MF $2 " ; shift 2 ;;
        --MG) PPOUTPUT+="-MG " ; shift 1 ;;
        --MP) PPOUTPUT+="-MP " ; shift 1 ;;
        --MT) PPOUTPUT+="-MT $2 " ; shift 2 ;;
        --MQ) PPOUTPUT+="-MQ $2 " ; shift 2 ;;
        --MD) PPOUTPUT+="-MD " ; shift 1 ;;
        --MMD) PPOUTPUT+="-MMD " ; shift 1 ;;
        --) shift ; break ;;
    esac
done
if [[ ! -z "$@" ]]; then
    case $(xdg-mime query filetype $@) in
    "text/x-csrc")
        STD="-xc"
        ;;
    "text/x-c++src")
        STD="-xc++ -std=c++11"
    "application/x-object")
        ;;
    *)
        (>&2 echo "$0: unrecognized file format")
        exit 1
        ;;
    esac
    if [[ ! -z "$STD" ]]; then
        if [[ -z "$CC" ]]; then
            (>&2 echo "$0: compiler not set")
            exit 1
        fi
        if [[ -z "$USERNAME" ]]; then
            (>&2 echo "$0: username not set")
            exit 1
        fi
        if $CC -dM -E -x c /dev/null grep ___clang___ > /dev/null; then
            PCH_ARCHIVE=fcxxss.h.clang.gz
            PCH_INCLUDE=-include-pch
            PCH_HEADER=fcxxss.h.pch
            PCH_SHEADER=fcxxss.h.pch
        else
            PCH_ARCHIVE=fcxxss.h.gcc.gz
            PCH_INCLUDE=-include
            PCH_HEADER=fcxxss.h.gch
            PCH_SHEADER=fcxxss.h
        fi
        TEMPDIR="/tmp/fcxxss"
        TEMPLOCK="$(echo $(pwd) | md5sum | cut -d ' ' -f1)"
        TEMPFILE="$@.cxx"
        (
            flock -s 200
            mkdir -p $TEMPDIR/$TEMPLOCK/$(dirname $TEMPFILE)
            #if [[ ! -f $ROOTDIR/include/$PCH_ARCHIVE ]]; then
            #    $CC            -xc++         -std=c++11        $CCFLAGS   -I   $ROOTDIR/include
$ROOTDIR/include/fcxxss.h        -E      -dD        |    gzip            --best         >
```

-continued

```
$ROOTDIR/include/$PCH_ARCHIVE
            #fi
            if [[ ! -f $TEMPDIR/$TEMPLOCK/$PCH_HEADER ]]; then
                zcat $ROOTDIR/include/$PCH_ARCHIVE | $CC -xc++-header -std=c++11
$OPT $CCFLAGS /dev/stdin -o $TEMPDIR/$TEMPLOCK/$PCH_HEADER
            fi
        if [[ ! -z "SCOMPILE" ]] && [[ -z "$OUTPUT" ]]; then
                OUTPUT+="-o $(echo $@ | sed 's/\..*$/.o/')"
            fi
        ) 200>/var/lock/$TEMPLOCK.fcxxss.lock
        ## IMPORTANT NOTE:
        # The following client portion: "ssh $USERNAME@fcxxss.fornux.com"
        # is replaced on the server by: "fcxxss -ast-print /dev/stdin -- $STD $ISYSTEM"
        if        $CC  $STD        $DEFINE  $INCLUDE   $ISYSTEM  -E         $@   |  ssh
$USERNAME@fcxxss.fornux.com                        -- $STD  $ISYSTEM                       >
$TEMPDIR/$TEMPLOCK/$TEMPFILE                       &&                $CC   -xc++   -std=c++11   $DEFINE
$INCLUDE                             $ISYSTEM           $PCH_INCLUDE
$TEMPDIR/$TEMPLOCK/$PCH_SHEADER          $OPT
$TEMPDIR/$TEMPLOCK/$TEMPFILE         $COMPILE   $OUTPUT                $PPOUTPUT
$LIBRARY $CCFLAGS; then
                #rm $TEMPDIR/$TEMPLOCK/$TEMPFILE
                exit 0
            else
                (>&2 echo "$0: intermediate file '$TEMPDIR/$TEMPLOCK/$TEMPFILE'")
                exit 1
            fi
        else
        if [[ -z "$LD" ]]; then
                (>&2 echo "$0: linker not set")
                exit 1
            fi
            $LD $OPT $@ $LIBRARY $LDFLAGS $OUTPUT
        fi
    else
        if [[ -z "$CC" ]]; then
            (>&2 echo "$0: compiler not set")
            exit 1
        fi
        $CC $OPT $LIBRARY
fi
```

The skilled artisan will understand that other scripting and/or programming languages may be used to implement the STSC features described above without limitation.

In some embodiments, the STSC may be compiled and distributed as a binary executable file.

In some embodiments, a C++ compiler may be integrated with the STSC so to produce a final executable code directly from the input source code.

In some embodiments, the STSC may be protected by one or more code obfuscation techniques such as any encryption method known in the art.

In some embodiments, an improved Root Pointer, described below, may be used to further associate a node_proxy on the stack for local memory allocations, which provides increased stability and performance. This pointer class is described below:

```
// Node proxy instantiated at each new compound statement, which identifies a new
scope
// level from which each Root Pointers will be associated to.
class node_proxy
{
    size_t const depth_; // ← Depth level on the stack frame this instance represents
    intrusivelist node_list_; // ← All associated Root Pointers at this exact depth level
    [...]
};
// Smart Pointer
template <typename T>
    class node_ptr_common
    {
        T * po_;
        [...]
    };
// Smart Pointer + Deterministic Memory Manager
template <typename T>
    class node_ptr : public node_ptr_common<T>
    {
        mutable node_proxy const * px_;
        [...]
    };
// Smart Pointer + Deterministic Memory Manager + Iterator
template <typename T>
```

```
class root_ptr< T> : public node_ptr< T>
{
    T * pi_; // ← Iterator
    char const * const pn_; // ← Name used for debugging
    [...]
};
```

As shown above, the improved root pointer comprises a proxy_node class that, when instantiated at a compound statement, is operable to identify a depth level on the stack frame and a list of all associated Root Pointers at this exact depth level. Furthermore, it also requires both the addition of a parameter to each function referencing this node_proxy from which the function is called in order to potentially promote objects allocated within that said function if a Root Pointer reassignment of a higher scope is performed; and the addition of an extra member object in each class referencing the node_proxy the was instantiated from in order to propagate that reference to all Root Pointers used by the other member variables and within the member functions of that class. Thus, implicit destruction of the node_proxy causes all the associated Root Pointers at the same depth level to be deallocated automatically.

Example 1: Exemplary C++ Source Code

In this example, an exemplary C source code shown below is written explicitly to generate cyclic memory leaks, and is illustratively used as an input source code. The STSC will then be used to implement the improved Root Pointer related code portions described above into this input source code. This input source code is given below:

```
/**
    Formux C++ Superset -- Example.
*/
#include <stdio.h>
#include <stdlib.h>
#include <unistd.h>
#include <sys/time.h>
#include <sys/resource.h>
double time_diff(struct timeval x , struct timeval y);
struct list_node
{
    struct list_node * p;
};
int main( )
{
    struct timeval before, after;
    gettimeofday(& before, (struct timezone *) NULL);
    for (int i = 0; ; ++ i)
    {
        // cycle
        struct list_node * p = malloc(sizeof(struct list_node));
        p->p = malloc(sizeof(struct list_node));
        p->p->p = malloc(sizeof(struct list_node));
        p->p->p->p = p;
        // stats
        gettimeofday(& after, (struct timezone *) NULL);
        struct rusage r_usage;
        getrusage(RUSAGE_SELF, & r_usage);
        printf("%ld, %ld\n", (long)time_diff(before , after), r_usage.ru_maxrss);
        fflush(stdout);
    }
    return 0;
}
double time_diff(struct timeval x , struct timeval y)
{
    double x_ms , y_ms , diff;
    x_ms = (double)x.tv_sec*1000000 + (double)x.tv_usec;
    y_ms = (double)y.tv_sec*1000000 + (double)y.tv_usec;
    diff = (double)y_ms - (double)x_ms;
    return diff;
}
```

As a comparison, below is an example of the corresponding improved source code automatically produced by the STSC from the input source code above:

```
//include "/usr/include/x86_64-linux-gnu/sys/resource.h"
//include "/usr/include/x86_64-linux-gnu/sys/time.h"
//include "/usr/include/unistd.h"
//include "/usr/include/stdlib.h"
//include "/usr/include/alloca.h"
//include "/usr/include/stdlib.h"
//include "/usr/include/x86_64-linux-gnu/sys/types.h"
//include "/usr/include/x86_64-linux-gnu/sys/sysmacros.h"
//include "/usr/include/x86_64-linux-gnu/sys/select.h"
//include "/usr/include/x86_64-linux-gnu/sys/types.h"
//include "/usr/include/stdlib.h"
//include "/usr/local/lib/clang/5.0.0/include/stddef.h"
//include "/usr/include/stdio.h"
#include "/usr/include/libio.h"
#include "/usr/local/lib/clang/5.0.0/include/stdarg.h"
#include "/usr/include/_G_config.h"
#include "/usr/local/lib/clang/5.0.0/include/stdarg.h"
#include "/usr/include/_G_config.h"
#include "/usr/local/lib/clang/5.0.0/include/stddef.h"
struct list_node;
namespace boost
{
    template <>
        list_node const & proxy(boost::node_proxy const & ___y, list_node const & p);
    template <>
        struct construct<list_node>
        {
            template <typename... Args>
            list_node operator ( ) (boost::node_proxy const & ___y, char const * n, Args const &... args);
                list_node operator ( ) (boost::node_proxy const & ___y, char const * n, list_node const & o);
        };
}
static boost::node_proxy ___x, ___y;
#line 19 "memoryleak.c"
double time_diff(boost::node_proxy const & ___y,
#line 19 "memoryleak.c"
struct timeval x,
#line 19 "memoryleak.c"
struct timeval y);
#line21 "memoryleak.c"
struct list_node
{
#line21 "memoryleak.c"
    boost::node_proxy const & ___x;
#line 23 "memoryleak.c"
    boost::root_ptr<std::vector<struct     list_node>>    p    = boost::construct<boost::root_ptr<std::vector<structlist_node>> >( )(___x, "p");
    list_node(boost::node_proxy const & ___y)
    : ___x(___y)
    {
    }
    list_node(boost::node_proxy const & ___y  , boost::root_ptr<std::vector<struct list_node>> const & p )
    : ___x(___y)
    , p(p)
    {
    }
    list_node & operator = (list_node const & ___o)
    {
        p = ___o.p;
        return * this;
    };
}
#line 27 "memoryleak.c"
int main( )
{
    boost::stack_node_proxy ___x;
#line 29 "memoryleak.c"
#line 29 "memoryleak.c"
    struct timeval before = boost::construct<struct timeval>( )(___x, "before"),
#line 29 "memoryleak.c"
    after = boost::construct<struct timeval>( )(___x, "after");
#line 31 "memoryleak.c"
    gettimeofday(std::addressof(before), boost::root_ptr<std::vector<struct timezone>>
```

```
        (___x, "", (boost::root_ptr<std::vector<void>> (___x, "", 0))));
#line 33 "memoryleak.c"
    for (
#line 33 "memoryleak.c"
        int i = boost::construct<int>( )(___x, "i", 0);; ++i)
        {
            boost::stack_node_proxy ___x;
#line 36 "memoryleak.c"
#line 36 "memoryleak.c"
            boost::root_ptr<std::vector<struct list_node>> p = boost::root_ptr<std::vector<struct list_node>> (___x, "p", boost::create<boost::root_ptr<std::vector<struct list_node>> ::value_type::value_type>( )(___x, (sizeof(struct list_node)) / sizeof(boost::root_ptr<std::vector<struct list_node>> ::value_type::value_type)));
#line 37 "memoryleak.c"
            p->p = boost::root_ptr<std::vector<struct list_node>> (___x, "", boost::create<boost::root_ptr<std::vector<struct list_node>> ::value_type::value_type>( )(___x, (sizeof(struct list_node)) / sizeof(boost::root_ptr<std::vector<struct list_node>> ::value_type::value_type)));
#line 38 "memoryleak.c"
            p->p->p = boost::root_ptr<std::vector<struct list_node>> (___x, "", boost::create<boost::root_ptr<std::vector<struct list_node>> ::value_type::value_type>( )(___x, (sizeof(struct list_node)) / sizeof(boost::root_ptr<std::vector<struct list_node>> ::value_type::value_type)));
#line 39 "memoryleak.c"
            p->p->p->p = p;
#line 42 "memoryleak.c"
            gettimeofday(std::addressof(after), boost::root_ptr<std::vector<struct timezone>> (___x, "", (boost::root_ptr<std::vector<void>> (___x, "", 0))));
#line 43 "memoryleak.c"
#line 43 "memoryleak.c"
            struct rusage r_usage = boost::construct<struct rusage>( )(___x, "r_usage");
#line 44 "memoryleak.c"
            getrusage(RUSAGE_SELF, std::addressof(r_usage));
#line 45 "memoryleak.c"
            printf(boost::root_ptr<std::vector<char>>(___x, "", "%ld, %ld\n"), (long)time_diff(___x, before, after), r_usage.ru_maxrss);
#line 46 "memoryleak.c"
            fflush(stdout);
        }
#line 49 "memoryleak.c"
    return boost::proxy(___y, 0);
}
#line 52 "memoryleak.c"
double time_diff(boost::node_proxy const & ___y,
#line 52 "memoryleak.c"
struct timeval x,
#line 52 "memoryleak.c"
struct timeval y)
{
    boost::stack_node_proxy ___x;
#line 54 "memoryleak.c"
#line 54 "memoryleak.c"
    double x_ms = boost::construct<double>( )(___x, "x_ms"),
#line 54 "memoryleak.c"
    y_ms = boost::construct<double>( )(___x, "y_ms"),
#line 54 "memoryleak.c"
    diff = boost::construct<double>( )(___x, "diff");
#line 56 "memoryleak.c"
    x_ms = (double)x.tv_sec * 1000000 + (double)x.tv_usec;
#line 57 "memoryleak.c"
    y_ms = (double)y.tv_sec * 1000000 + (double)y.tv_usec;
#line 59 "memoryleak.c"
    diff = (double)y_ms - (double)x_ms;
#line 61 "memoryleak.c"
    return boost::proxy(___y, diff);
}
namespace boost
{
    template <>
        inline list_node const & proxy(boost::mode_proxy const & ___y, list_node const & ___o)
        {
            boost::proxy(___y, ___o.p);
            return o;
        }
    template <typename... Args>
        inline list_node construct<list_node>::operator ( ) (boost::mode_proxy const & ___y, char const * n, Args const &... args)
        {
```

-continued

```
            return list__node(___y, args...);
        }
        inline list__node construct<list__node>::operator ( ) (boost::mode__proxy const & ___y,
char const * n, list__node const & o)
        {
            return list__node(o);
        }
}
```

Figure 6:
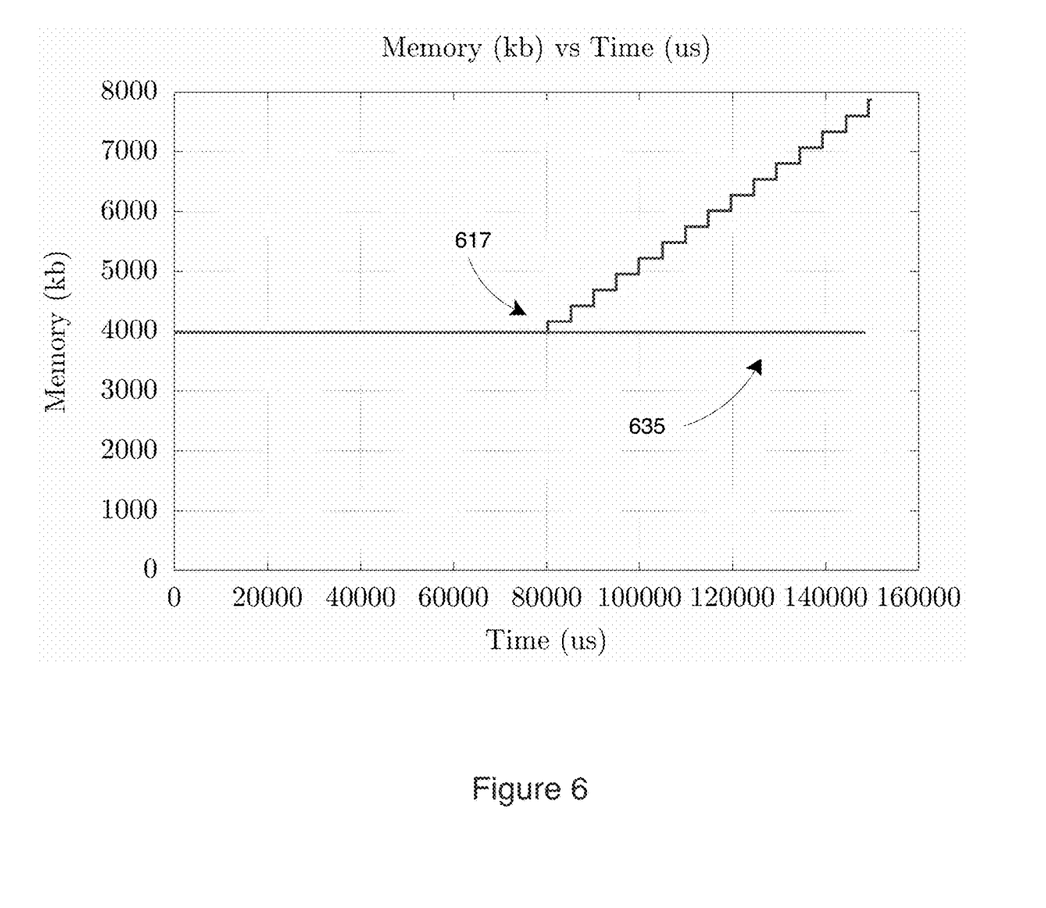
FIG. 6 is a graphical plot illustrating the amount of memory used by an exemplary C++ program explicitly written to produce a cyclic memory leak and the same program compiled from the improved C++ code generated by a source-to-source compiler as described herein, according to one embodiment.

The skilled artisan will understand that the above changes are not trivial to implement and that they require a deep understanding of the Root Pointer for proper integration. By using the STSC described herein, any programmer may be able to automatically implement the Root Pointer Memory management functionalities into their code. The performance of both source codes (before and after) is shown in FIG. 6, where a plot illustrates the memory use of both applications as a function of runtime. At point 617, we see the start of a gradual increase original application memory footprint (e.g. a memory leak), while the application compiled from the improved source code generated by the STSC shows no memory leak at all (see region 653).

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A memory management system operable on input source code for an existing computer program, the system comprising:
    a computer-readable medium having computer-readable code portions stored thereon to implement, when executed, a deterministic memory manager (DMM), wherein said code portions comprise smart pointer code portions and associated node pointer code portions for implementing a smart pointer that automatically replaces explicit memory deallocation with implicit memory deallocation in target memory allocation source code portions;
    a source-to-source compiler operable to:
        automatically identify memory allocation source code portions within the input source code; and
        automatically inject corresponding DMM code portions of said DMM into the input source code to specifically target said automatically identified memory allocation source code portions therein to thereby generate an improved source code that once compiled, produces a correspondingly improved computer program that automatically replaces memory management in the input source code through execution of said injected corresponding DMM code portions.

2. The system of claim 1, wherein the input source code and the improved source code are C or C++ source codes.

3. The system of claim 2, wherein the smart pointer is a Root Pointer.

4. The system of claim 1, wherein said identifying and injecting comprise statically analyzing the Abstract Syntax Tree (AST) of the input source code.

5. The system of claim 4, wherein said analyzing is implemented using a Clang C-language family front end.

6. The system of claim 1, wherein said smart pointer further comprises a local memory allocation node pointer.

7. The system of claim 1, wherein said source-to-source compiler comprises a computer-readable medium having instructions stored thereon to define a binary executable file that, when executed, performs the functions thereof.

8. The system of claim 1, further comprising an output compiler for compiling said improved source code to produce said improved computer program.

9. A method for converting an input source code into an improved source code to address memory misallocations therein, the method comprising, using a hardware processor:
    statically analyzing said input source code to identify memory-allocation-related code portions; and injecting corresponding memory management code portions to specifically target said identified memory-allocation-related code portions into the input source code such that, upon being compiled and executed, said injected memory management code portions automatically and deterministically replaces explicit memory management with implicit memory management in the input source code.

10. The method of claim 9, wherein said statically analyzing comprises:

generating an Abstract Syntax Tree (AST) of the input source code; and printing said AST to inject said memory-allocation-related code portions.

11. The method of claim 9, wherein said memory management code portions comprise smart pointer code portions and associated node pointer code portions of a deterministic memory manager (DMM).

12. The method of claim 11, wherein said DMM is a Root Pointer.

13. The method of claim 9, wherein the input source code and the improved source code are C or C++ source codes.

14. A Root Pointer for improved deterministic memory management for local memory allocations in a C or C++ source code, said Root Pointer comprising:

one node_proxy class instance instantiated at a compound statement and operable to identify a depth level on the stack frame from which each Root Pointer will be associated therewith;

an extra parameter added to each function referencing the node_proxy from which said function is called therefrom to promote an object depth level of objects allocated within said function, wherein, upon a return by said function of said objects allocated within said function, said promoted object depth level is reassigned to said depth level referencing the node proxy from which said function is called;

an extra member object in each class referencing the node_proxy from which said class was instantiated therefrom to propagate said reference to all Root Pointers used by other member variables; and a list of all associated Root Pointers at said depth level of said node_proxy class instance;

wherein implicit destruction of said node_proxy causes the associated Root Pointers at the same depth level to be deallocated automatically.

\* \* \* \* \*